Patented May 17, 1927.

1,629,096

UNITED STATES PATENT OFFICE.

ARTHUR L. DAVIS, OF ALTON, ILLINOIS.

COSMETIC.

No Drawing.    Application filed November 22, 1923.   Serial No. 676,257.

The present invention relates to cosmetics, and more particularly to that type of cosmetics which are used for bleaching the human skin and for absorbing oily secretions of the pores of the skin.

Silica gel has been used as an absorption agent in the treatment of gases, vapors and liquids, particularly for drying air, recovering solvents from gas vapor mixtures, and for decolorizing liquids, particularly petroleum lubricating oils.

I have discovered that the human skin may be effectively cleared up, bleached and cleaned by the use of silica gel. Many forms of silica gel have been made, but the active silica gel which is normally made in commerce and has a high degree of porosity is entirely too active for use on the human skin. Accordingly, if the silica gel is to be used for bleaching purposes I have found that a mixture of 25 to 50 per cent of the gel with finely pulverized fuller's earth will give an effective bleaching composition. Both the silica gel and the fuller's earth have active bleaching properties, but the bleaching property of the fuller's earth is very small compared to that of silica gel, so that the mixture can be effectively used for bleaching purposes.

In utilizing the high absorptive power of the gel with reference to the absorption of the oily materials which are secreted from the pores of the skin, a mixture of silica gel with powdered talc in substantially equal proportions is very effective. If the absorptive properties of silica gel are low, the silica gel may be used alone, and in accordance with the relative activity of the silica gel, from 25 to 50 per cent of powdered talc may be used to form an effective cosmetic. The talc should preferably be very fine (not coarser than 150 mesh) and the silica gel should be equally fine. In preparing the silica gel therefore for a cosmetic it is not necessary that the gel be pulverized as fine as the ordinary toilet preparations, but the use of finely pulverized material is very effective and gives excellent results. When talc is used as a diluent this material does not have any special absorptive powers, and will absorb oils and other secretions to assist the silica gel in bleaching and clearing up the skin.

In the claims the term "silica gel" is used for defining the absorptive material, and by this term it is intended to cover broadly gels containing colloidal silicic acid. The gels included within the term "silica gel" are the porous colloidal silicic acids per se and the gels which contain the colloidal silicic acid in combination with other metallic oxides.

The preferred form of the invention having been thus described, what is claimed as new is:

1. A cosmetic capable of absorbing matter from and bleaching the human skin, comprising silica gel reduced to a fine state of pulverization.

2. A cosmetic capable of absorbing matter from the human skin comprising silica gel mixed with a pulverized diluent material.

3. A cosmetic capable of absorbing matter from the human skin comprising silica gel mixed with pulverized talc.

4. A cosmetic capable of absorbing matter from the human skin comprising a mixture of silica gel and talc pulverized to a fineness of at least 150 mesh per square inch.

5. A cosmetic capable of absorbing matter from the human skin comprising a mixture of silica gel and pulverized talc in which the talc constitutes from 25 to 50 per cent of the mixture.

6. A process of bleaching and cleansing the human skin comprising applying to the skin a coating of pulverized silica gel and permitting the coating to remain in contact with the skin until the oil and impurities have been absorbed from the surface and pores of the skin and then removing the coating.

7. A process of bleaching and cleansing the human skin comprising applying to the skin a coating containing silica gel pulverized to a fineness of at least 150 mesh per square inch, and pulverized talc in sufficient quantity to temper the absorbing power of the silica gel, permitting the coating to remain in contact with the skin until the oils and impurities have been absorbed from the surface and pores of the skin and then removing the coating.

In testimony whereof I affix my signature.

ARTHUR L. DAVIS.